(12) United States Patent
Lail et al.

(10) Patent No.: US 6,813,421 B2
(45) Date of Patent: Nov. 2, 2004

(54) FIBER OPTIC CABLE HAVING A RIPCORD

(75) Inventors: Jason C. Lail, Conover, NC (US); Jody L. Greenwood, Hickory, NC (US); Patrick K. Strong, Connelly Springs, NC (US); Roger K. Peterson, Conover, NC (US); Bradley J. Blazer, Granite Falls, NC (US); William E. Caldwell, Hickory, NC (US); Richard S. Wagman, Hickory, NC (US); Douglas S. Hedrick, Connelly Springs, NC (US)

(73) Assignee: Corning Cable Systems LLC, Hickory, NC (US)

( * ) Notice: Subject to any disclaimer, the term of this patent is extended or adjusted under 35 U.S.C. 154(b) by 92 days.

(21) Appl. No.: 10/036,027

(22) Filed: Dec. 26, 2001

(65) Prior Publication Data

US 2003/0118295 A1 Jun. 26, 2003

(51) Int. Cl.[7] .................................................. G02B 6/44
(52) U.S. Cl. ...................... 385/101; 385/102; 385/104; 385/109; 385/111
(58) Field of Search ................................. 385/101, 100, 385/102–113

(56) References Cited

U.S. PATENT DOCUMENTS

| | | | |
|---|---|---|---|
| 4,038,489 A | 7/1977 | Stenson et al. ................ 174/70 |
| 4,435,238 A | 3/1984 | Smith .......................... 156/171 |
| 4,909,592 A | 3/1990 | Arroyo et al. ............. 350/96.23 |
| 4,913,515 A | 4/1990 | Braunmiller et al. ..... 350/96.23 |
| 4,960,318 A | 10/1990 | Nilsson et al. ........... 350/96.23 |
| 4,964,691 A | 10/1990 | Nelson et al. ............ 350/96.23 |
| 5,029,974 A | 7/1991 | Nilsson ..................... 350/96.23 |
| 5,173,961 A | 12/1992 | Chiasson ..................... 385/113 |
| 5,188,883 A | 2/1993 | Rawlyk ....................... 428/189 |
| 5,212,349 A | 5/1993 | Pelzer ......................... 174/98 |
| 5,243,675 A | 9/1993 | Kathiresan et al. ......... 385/109 |
| 5,249,248 A | 9/1993 | Arroyo et al. ............... 385/113 |
| 5,268,971 A | 12/1993 | Nilsson et al. .............. 385/101 |
| 5,268,983 A | 12/1993 | Tatarka et al. .............. 385/106 |
| 5,321,788 A | 6/1994 | Arroyo ........................ 385/109 |
| 5,345,525 A | 9/1994 | Holman et al. .............. 385/104 |
| 5,345,526 A | 9/1994 | Blew ........................... 385/112 |
| 5,389,442 A | 2/1995 | Arroyo et al. ............... 428/396 |
| 5,542,020 A | 7/1996 | Horska ........................ 385/112 |
| 5,621,841 A | 4/1997 | Field ........................... 385/113 |
| 5,642,452 A | 6/1997 | Gravely et al. .............. 385/113 |
| 5,838,864 A | 11/1998 | Patel et al. .................. 385/113 |
| 5,970,196 A | 10/1999 | Greveling et al. ........... 385/114 |
| 6,192,178 B1 | 2/2001 | Logan et al. ................ 385/109 |
| 6,236,790 B1 * | 5/2001 | Okada et al. ................ 385/102 |
| 6,541,706 B2 * | 4/2003 | McLeod ................... 174/102 R |
| 2001/0043781 A1 * | 11/2001 | Yokokawa et al. .......... 385/102 |

FOREIGN PATENT DOCUMENTS

| | | | |
|---|---|---|---|
| DE | 19856814 A1 | 6/2000 | ............ H01B/7/18 |
| EP | 0416207 A2 | 5/1990 | ............ G02B/6/44 |
| EP | 0416207 A3 | 5/1990 | ............ G02B/6/44 |
| EP | 0416207 B1 | 5/1990 | ............ G02B/6/44 |
| JP | 2000241681 A * | 8/2000 | ............ G02B/6/44 |

OTHER PUBLICATIONS

Walsh, P., "Carbon Fibers", 2001, ASM Handbook, vol. 21, p. 35–40.*

* cited by examiner

Primary Examiner—Akm Enayet Ullah
Assistant Examiner—Sung Pak
(74) Attorney, Agent, or Firm—Michael E. Carroll, Jr.

(57) ABSTRACT

A fiber optic cable including a cable core having at least one optical fiber and a ripcord. In one embodiment, the ripcord is a conductive material operative, upon application of a sufficient pulling force, to rip at least one cable component for facilitating access to said at least one optical fiber. In other embodiments, the ripcord is formed from a semi-conductive material, the ripcord is removably attached to at least one cable component, and/or the ripcord has an excess length.

18 Claims, 3 Drawing Sheets

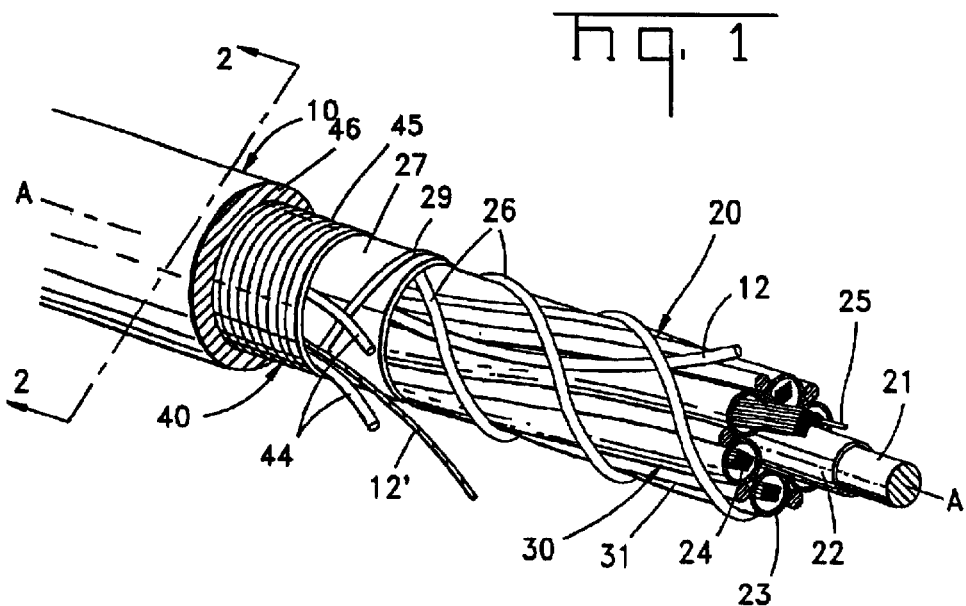
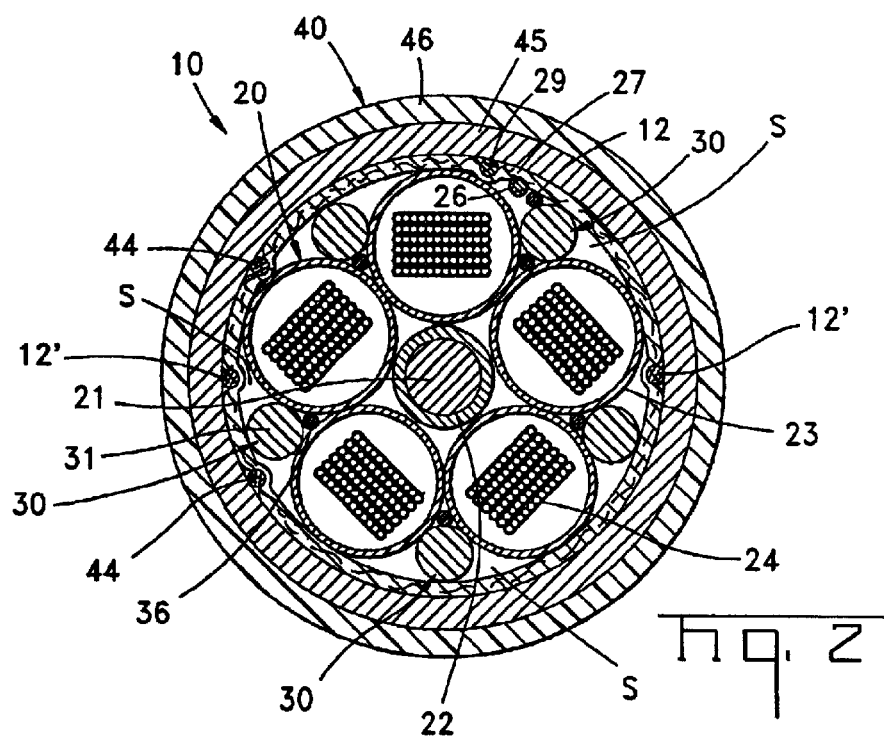

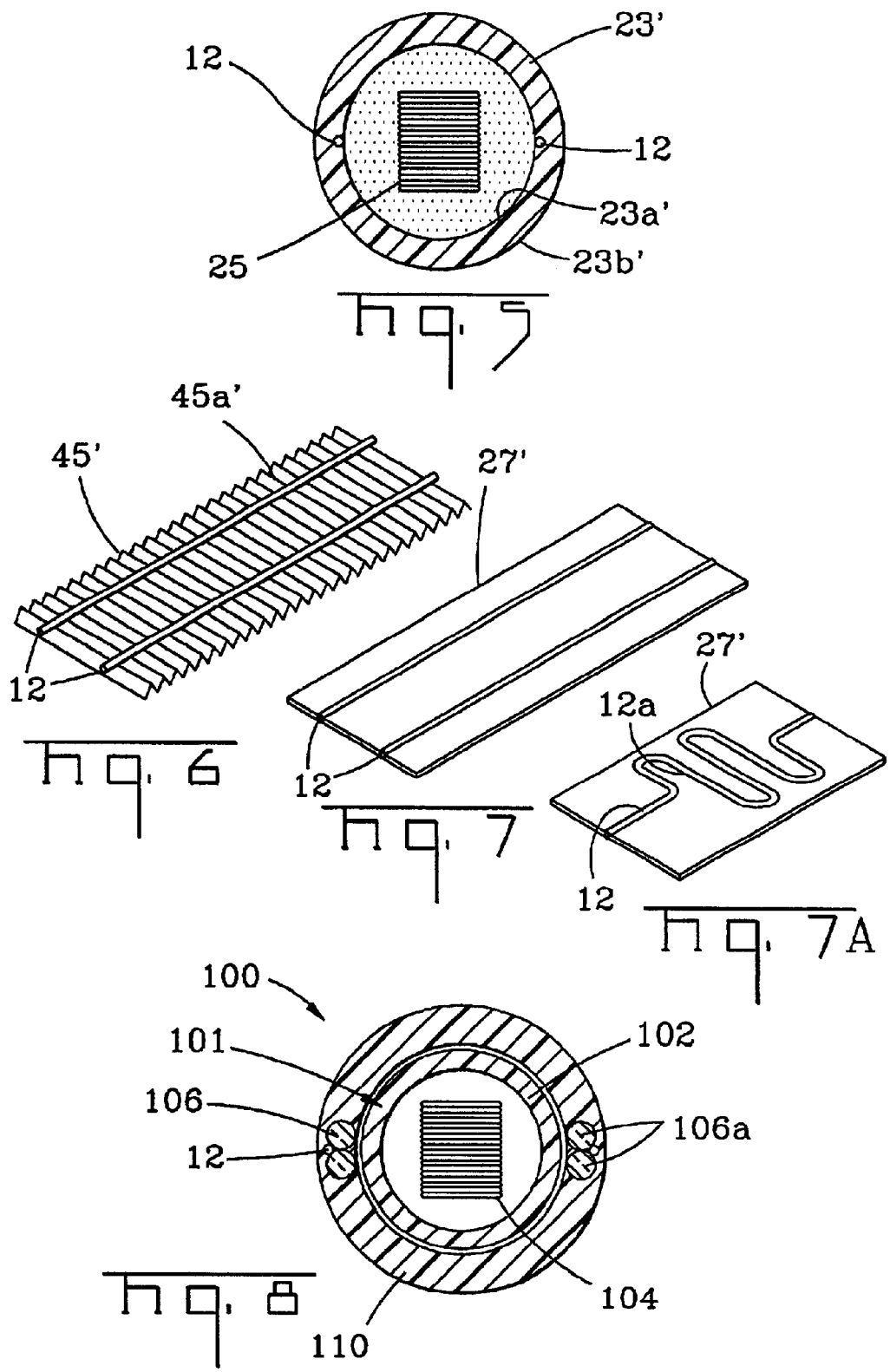

FIBER OPTIC CABLE HAVING A RIPCORD

FIELD OF THE INVENTION

The present invention relates to fiber optic cables and, more particularly, to fiber optic cables having a ripcord for ripping at least one cable component.

BACKGROUND OF THE INVENTION

Fiber optic cables include optical fibers that transmit signals, for example, voice, video, and/or data information. Craftsmen require access to the optical fibers within the fiber optic cable, for example, for termination. Fiber optic cables designed for indoor, outdoor, or indoor/outdoor applications may include one or more ripcords to facilitate access to the optical fibers.

Ripcords rip cable components, for example, an armor tape of the fiber optic cable and/or the cable jacket, whereby the tear facilitates removal of the armor tape and/or the cable jacket for accessing buffer tubes having optical fibers therein. Conventional ripcords are threads or yarns made from dielectric materials such as nylon, aramid fiber, or polyester. The dielectric thread or yarn size of a conventional ripcord is generally specified by a denier. A denier is a unit of weight per length (grams per 9000 meters) of material for measuring the fineness of threads, yarns, and the like. Dielectric materials are used as conventional ripcords to make an all-dielectric fiber optic cable, thereby inhibiting damage caused by, for example, lightening strikes.

However, an all-dielectric fiber optic cable has disadvantages, for example, it is difficult to detect when buried. In order to overcome this difficulty in detection, a metal wire can be buried in close proximity to a buried all-dielectric fiber optic cable. Burying a metal wire with an all-dielectric cable for detecting the fiber optic cable is time-consuming, requires additional expense, and is burdensome.

To overcome burying a metal wire with an all-dielectric fiber optic cable, some fiber optic cables employ, for example, a corrugated metallic armor allowing the craftsman to detect the buried fiber optic cable. However, the corrugated metallic armor must be electrically grounded to inhibit damage caused by lightning strikes. Grounding the corrugated metallic armor of the fiber optic cable requires special hardware that clamps to the armor so that the fiber optic cable can be electrically connected to ground. Installing this special grounding hardware is also time-consuming, requires additional expense, and is burdensome. Moreover, fiber optic cables with different diameters can require different sizes of grounding hardware. Additionally, the corrugated metallic armor increases the outer diameter of the fiber optic cable, which is generally undesirable.

It is known that conventional ripcords can be located at various positions within a fiber optic cable. For example, U.S. Pat. No. 5,642,452 discloses a fiber optic cable with two conventional ripcords. A radially outermost conventional ripcord is located radially inwardly of strength members for ripping the strength members and an outer cable jacket. A radially innermost conventional ripcord is located radially inwardly of an inner jacket for ripping the inner jacket. U.S. Pat. No. 5,621,841 discloses a fiber optic cable having two conventional ripcords. The conventional ripcords are in diametrically opposed locations relative to a center of the cable, and the conventional ripcords are located radially inwardly of a steel tape and an outer sheath. The conventional ripcords are arranged for ripping the armor and possibly the outer sheath as well. U.S. Pat. No. 4,913,515 discloses a fiber optic cable with a conventional glass or aramid fiber ripcord located radially inwardly of optical fibers embedded in a plastic jacket. The conventional ripcord is operative to rip the plastic jacket, and the fiber optic cable may then be unrolled to define an optical fiber ribbon. U.S. Pat. No. 5,268,983 discloses a dielectric fiber optic cable with two conventional ripcords. A radially outermost nylon ripcord is located radially inwardly of an outer jacket for ripping the outer jacket. A radially innermost conventional ripcord is part of a core-tube jacket for ripping the core-tube jacket. U.S. Pat. No. 5,029,974 discloses a fiber optic cable with a conventional ripcord for ripping an armor tape and a cable sheath. U.S. Pat. No. 5,173,961 discloses a fiber optic cable with two conventional ripcords that lie partly within a metallic cable sheath and partly outside of the metallic cable sheath by extending between overlapping edges of the metallic sheath. The two conventional ripcords are applied in phase to avoid crossing of the conventional ripcords as they extend along the fiber optic cable. U.S. Pat. No. 5,321,788 discloses a fiber optic cable that includes a year or color marker under a tape, and includes two conventional ripcords for facilitating removal of an armor tape and a cable jacket.

Certain cable components, for example, a corrugated metal armor layer can require relatively high forces in order for the conventional ripcord to rip therethrough. Relatively high forces can cause conventional ripcords to break during the ripping action, which is undesirable.

Additionally, the craftsman can unintentionally sever the conventional ripcord when he is trying to expose and access the conventional ripcord. For example, when the craftsman is attempting a mid-span access he makes a ring cut around the entire circumference of the fiber optic cable in order to expose the conventional ripcord therein. A ring cut around the entire circumference is required because the craftsman does not know the circumferential position of the conventional ripcord within the fiber optic cable. During this ring cut the craftsman can unintentionally sever the conventional ripcord with his cutting tool. After the ring cut is made, the craftsman bends the fiber optic cable in an attempt to expose and access the conventional ripcord, however, in the process he may damage the fiber optic cable. Once the craftsman locates the conventional ripcord he passes a sharp extraction tool beneath the ripcord to withdraw it outwardly through the ring cut. However, this can be difficult and may require the craftsman to further make a longitudinal cut along the fiber optic cable to access a sufficient length of the conventional ripcord to permit use thereof.

SUMMARY OF THE INVENTION

One aspect of the present invention is directed to a fiber optic cable including a cable core having at least one optical fiber, a ripcord, the ripcord being an electrically conductive material operative, upon application of a sufficient pulling force, to rip at least one cable component for facilitating access to the at least one optical fiber.

Another aspect of the present invention is directed to a fiber optic cable including a cable core having at least one optical fiber, a ripcord, the ripcord having a portion being an electrically semi-conductive material operative, upon application of a sufficient pulling force, to rip at least one cable component for facilitating access to the at least one optical fiber.

A further aspect of the present invention is directed to a fiber optic cable including a cable core having at least one optical fiber, a ripcord, the ripcord having an excess length with respect to an associated portion of the fiber optic cable and being operative, upon application of a sufficient pulling force, to rip at least one cable component for facilitating access to the at least one optical fiber.

BRIEF DESCRIPTION OF THE FIGURES

FIG. 1 is a schematic view of a fiber optic cable according to the present invention.

FIG. 2 is a cross-sectional view of the fiber optic cable of FIG. 1 taken along line 2—2.

FIG. 5 is a cross-sectional view of a tube according to another embodiment of the present invention.

FIG. 6 is a schematic view of an armor according to another embodiment of the present invention.

FIG. 7 is a schematic view of a water-swellable tape according to another embodiment of the present invention.

FIG. 7a is a schematic view of a water-swellable tape according to still another embodiment of the present invention.

FIG. 8 is a cross-sectional view of a fiber optic cable according to another embodiment of the present invention.

DETAILED DESCRIPTION OF THE INVENTION

Figure 3:
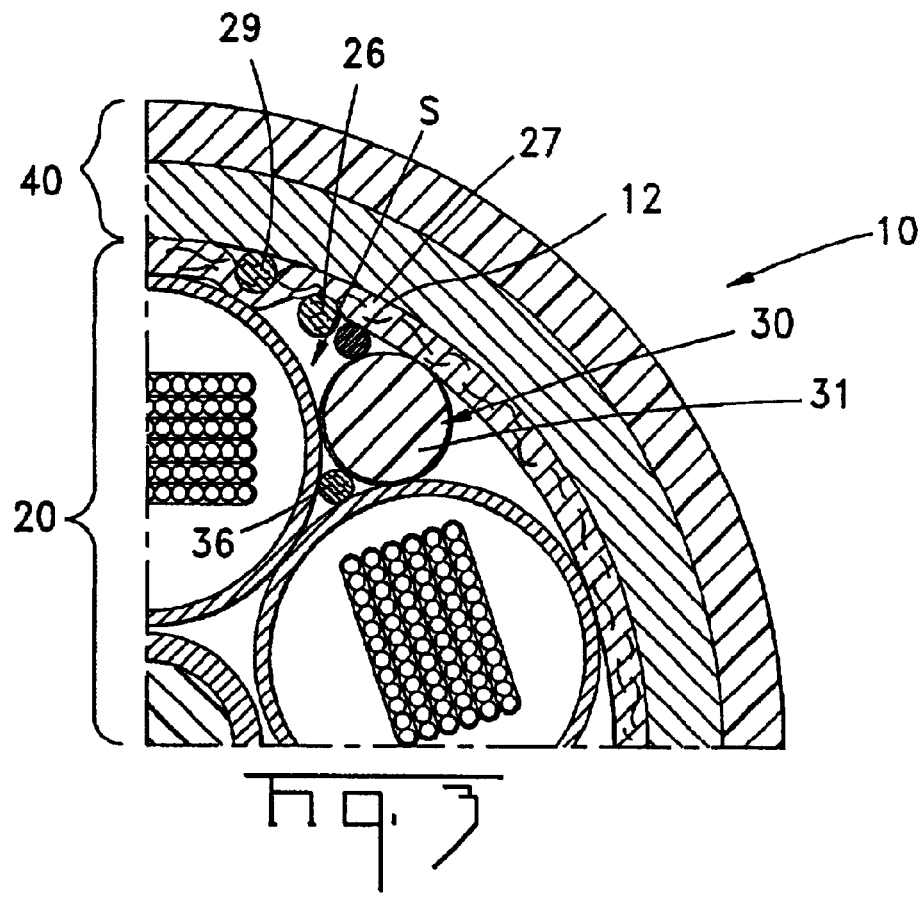
FIG. 3 is a section of the fiber optic cable of FIG. 2.

Referring to FIGS. 1–4, the present invention will be described with reference to an exemplary fiber optic cable 10 having at least one ripcord therein. Ripcords of the present invention may be robust conductive materials, for example, copper, steel, aluminum, or copper-cladded steel; however other suitable materials can be used such as semi-conductive materials, for example, carbon fiber. Embodiments of the present invention may generally exclude conventional ripcords; however, concepts of the present invention can be practiced with fiber optic cables that include at least one conventional ripcord as disclosed herein. Ripcords are operative to, upon application of a sufficient outwardly directed pulling force, rip through at least a portion of one cable component, for example, an armor tape and/or a cable jacket. The ripping procedure can be repeated for as many ripcords as the cable contains. Additionally, the concepts of the present invention may be advantageously practiced in a hybrid fiber optic cable. Hybrid fiber optic cable or a hybrid embodiment means a fiber optic cable having at least one ripcord that includes a conventional ripcord and at least one ripcord that includes a conductive or a semi-conductive material.

Using a ripcord made from a conductive material according to the present invention is advantageous. First, forming a ripcord from a conductive material according to the present invention advantageously allows the craftsmen to locate a buried fiber optic cable. More specifically, a conductive ripcord allows the fiber optic cable to be tonable. Tonability allows the craftsmen to send an electrical signal through the ripcord to locate a buried fiber optic cable. Moreover, conductive ripcords according to the present invention are operable to be electrically connected to ground without the different sizes of special hardware required with fiber optic cables having a corrugated metallic armor. Instead, conductive ripcords of the present invention can be grounded using universal, inexpensive grounding hardware. Still further, fiber optic cables without a corrugated metallic armor generally have a smaller outer diameter. Second, the relatively high strength of a suitable conductive material used for ripcords of the present invention can rip through, for example, a metal armor layer with less risk of breaking.

Third, unlike conventional ripcords, conductive ripcords of the present invention have a surface hardness allowing the forming of a surface roughness thereon (FIG. 4), for example, a surface that is serrated, knurled or notched; however, other suitable rough surfaces can be used. This surface roughness allows the ripcord to more easily rip through at least a portion of at least one cable component. Additionally, unlike conventional ripcords, the surface hardness of conductive ripcords of the present invention generally inhibits the craftsman from severing the conductive ripcord when making a ring cut with his cutting tool. Still further, by using conductive ripcords of the present invention the craftsman can use a commercially available detector to locate the circumferential position of the conductive ripcord within the cable before cutting into the fiber optic cable. This advantageously makes accessing optical fibers within the fiber optic cable faster and easier because the craftsman is not required to make a ring cut around the entire circumference of the cable to access a conductive ripcord.

Conductive ripcords of the present invention generally include a tensile strength preferably in the range of about 20 ksi to about 230 ksi, more preferably in the range of about 100 ksi to about 200 ksi; however, the tensile strength of the conductive ripcords can have other suitable ranges. Additionally, conductive ripcords of the present invention generally include a Brinell Hardness Number (BHN) preferably in the range of about 40 to about 460, more preferably in the range of about 200 to about 400; however, the Brinell Hardness Number can have other suitable ranges.

Semi-conductive ripcords of the present invention may be a composite material or non-composite material. For example, a semi-conductive composite material can be a carbon fiber having a thermoplastic or thermoset coating and/or matrix; however, other suitable materials may be used for the coating and/or matrix. Generally, non-composite semi-conductive ripcords of the present invention include a resistivity preferably in the range of about 500 micro-ohms per centimeter to about 4000 micro-ohms per centimeter, more preferably in the range of about 700 micro-ohms per centimeter to about 1500 micro-ohms per centimeter; however, the resistivity can include other suitable ranges. Additionally, non-composite semi-conductive ripcords of the present invention include a tensile strength preferably in the range of about 400 ksi to about 1000 ksi, more preferably in the range of about 500 ksi to about 800 ksi; however, the tensile strength of the non-composite semi-conductive ripcords can have other suitable ranges.

Generally, semi-conductive composite ripcords of the present invention include a resistivity preferably in the range of about 150 micro-ohms per centimeter to about 3000 micro-ohms per centimeter, more preferably in the range of about 400 micro-ohms per centimeter to about 900 micro-ohms per centimeter; however, the resistivity can include other suitable ranges. Additionally, the semi-conductive composite ripcords of the present invention include a tensile strength preferably in the range of about 200 ksi to about 800 ksi, more preferably in the range of about 300 ksi to about 500 ksi; however, the tensile strength of the non-composite semi-conductive ripcords can have other suitable ranges.

Fiber optic cable 10 includes a cable core 20 and a sheath section 40. Core section 20 includes buffer tubes 23 with a cable core binder 26 stranded therearound, a water-swellable tape 27 surrounds binder 26, and a tape binder 29 is stranded around water-swellable tape 27. Cable core 20 includes interstitial assemblies 30 disposed in respective interstices S (FIG. 2). According to one embodiment of the present invention, at least one of interstitial assemblies 30 includes a ripcord 12 located radially inwardly of cable core binder 26. Ripcord 12 is operative to, upon application of a sufficient outwardly directed pulling force, rip cable core binder 26, water-swellable tape 27, and tape binder 29, thereby obviating the need for a cutting tool to do the same. Eliminating the need for a cutting tool saves time and avoids potential injury to the craftsman and inadvertent damage to buffer tubes and/or other cable components. In one hybrid embodiment according to the present invention, ripcord 12 is a dielectric ripcord and ripcord 12', which is intended to be ripped through an armor layer 45 and a cable jacket 46, is a conductive or semi-conductive ripcord. However, in other embodiments ripcords 12 and 12' are similar, for example, both conductive or both semi-conductive. In yet other embodiments, ripcord 12 is semi-conductive and ripcord 12' is conductive, or vice versa.

Cable core 20 includes a central strength member 21 formed of a dielectric material. A water-swellable tape 22 surrounds central strength member 21 and a plurality of buffer tubes 23 generally surround water-swellable tape 22. Each buffer tube 23 includes optical fiber ribbons 24 having optical fibers 25 therein. In one embodiment, buffer tubes 23 are preferably S-Z stranded about central strength member 21 in a conventional S-Z stranding manufacturing process. In other embodiments, dielectric filler rods may be substituted for one or more buffer tubes 23. Cable core 20 is bound together by at least one cable core binder 26. When more than one binder 26 is stranded about cable core 20, the binders may be counter-helically stranded. In one embodiment, water-swellable tape 27 is a spunbonded nonwoven polyester tape impregnated with a suberabsorbent material. However, water-swellable tape 27 can have alternative functions, in lieu of or in addition to water-blocking, for example, a fire-safety tape including a KAPTON® or a TEFLON® material for flame retardance. In one embodiment, cable core and tape binders 26 and 29 are preferably a polyester (PBT) binder having a denier of about 1625 with a flat or a round cross-section. The combination of material and denier for binders 26 and 29 is advantageous because it renders cable core binder 26 strong enough to retain water-swellable tape 27 in its place in cable core 20, and yet binders 26 and 29 are susceptible to being ripped by ripcord 12 upon application of a sufficient pulling force.

As best shown in FIGS. 2 and 3, each interstitial assembly 30 includes a cable reinforcing member, for example, a crush-strength member 31. In one embodiment, crush-strength member 31 is preferably a rod formed of, for example, a low or medium density polyethylene material or a polypropylene material. Interstitial assemblies 30 also include a water-swellable member, for example, a commercially available water-swellable yarn 36. Water-swellable yarn 36 is disposed longitudinally along crush-strength member 31.

According to one embodiment of the present invention, ripcord 12 is S-Z stranded in cable core 20 as part of at least one interstitial assembly 30. When ripcord 12 is S-Z stranded as part of an interstitial assembly 30, it is positioned along a radially outward surface of crush-member 31, but generally beneath cable core binder 26. In another embodiment, ripcord 12 is longitudinally disposed relative to a longitudinal axis of cable 10. When longitudinally disposed, ripcord 12 will preferably be placed at an opposed location relative to an overlap of water-swellable tape 27 to facilitate ripping of thereof.

According to the present invention, a tensile strength of ripcord 12 and the tensile strength and denier of binders 26 and 29 are balanced for optimum performance. Preferably, the present invention is practiced with a relatively high tensile strength ripcord 12 compared with the respective tensile strengths and deniers of binders 26 and 29. Binders 26 and 29 are thereby rendered strong enough to perform their binding function; on the other hand, binders 26 and 29 are susceptible to being ripped by ripcord 12 upon application of a sufficient pulling force. In one embodiment, ripcord 12 is a 3000 denier aramid yarn; however, other suitable materials may be used, for example, nylon or polyester. The aramid yarn ripcord 12 preferably has a range of about 1.5 to about 2.5 times the denier of PBT binders 26 and 29. The preferred denier ratio about 1.5 to about 2.5 accounts for the strength ripcord 12 should embody to rip binders 26 and 29 and water-swellable tape 27. Additionally, binders 26 and/or 29 may be formed of an orientated polymer material to provide a strong tensile strength, but yields in shear when ripped by ripcord 12. Binders 26 and 29 may be weakened, for example, by perforations formed therein to facilitate ripping thereof.

In another embodiment of the present invention, ripcord 12 is a steel wire having a diameter between about 0.012 inches and about 0.032 inches; however, other suitable conductive or semi-conductive ripcords may be used, for example, a stranded conductive wire. In other embodiments, depending on the relative respective strengths and deniers of binders 26 and 29 and the resistance to ripping exhibited by other cable components, other suitable materials and/or diameters may be used for ripcord 12. For example, ripcords may be coated with a material such as a thermoplastic to inhibit corrosion or otherwise treated with a superabsorbent material.

Sheath section 40 includes two ripcords 12' that are located generally 180 degrees apart relative to the center of fiber optic cable 10. Ripcord 12' may be formed from a different material than ripcord 12, or from the same material as ripcord 12. For example, in one embodiment ripcord 12' is a steel wire operable for locating fiber optic cable 10 when buried. In another embodiment, ripcord 12' is a semi-conductive material. Armor tape 45 surrounds ripcord 12' and eight helically-stranded dielectric strength members 44 and cable jacket 46 generally surrounds armor tape 45. Ripcord 12' is arranged to rip armor tape 45 and cable jacket 46.

Figure 4:
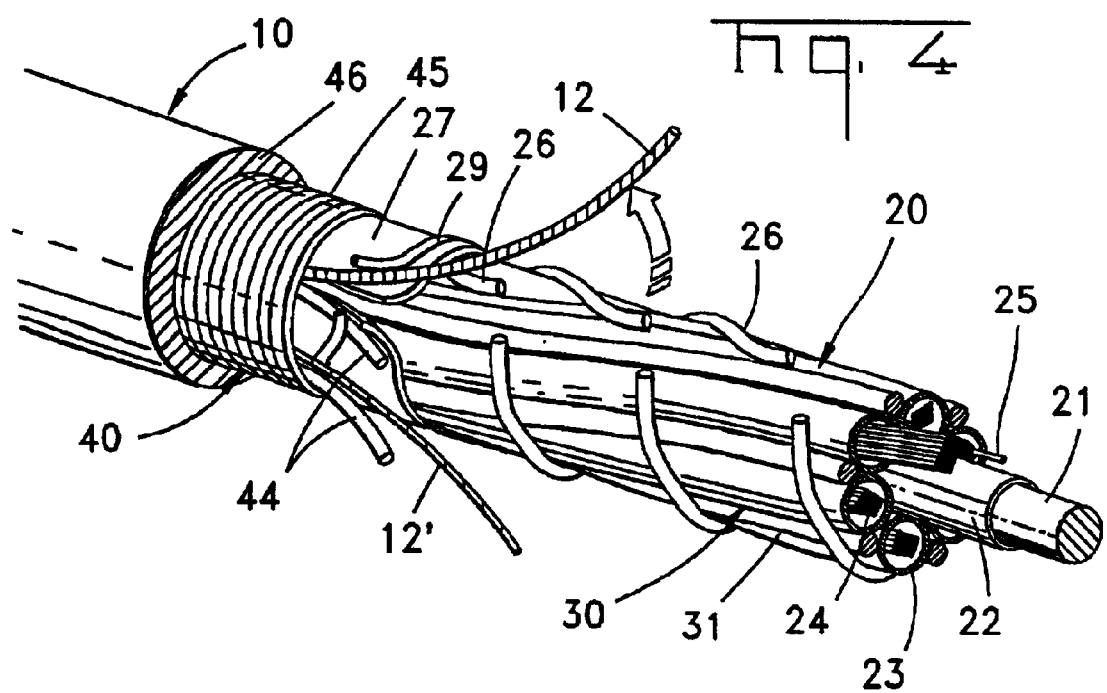
FIG. 4 is a schematic view of a fiber optic cable after a ripcord has ripped at least one cable component.

When it is desired to access the optical fibers in fiber optic cable 10, the cable is cut, and ripcord 12' is used to rip armor tape 45 and/or cable jacket 46. Strength members 44 are then unwrapped. Next, a sufficient pulling force is applied to ripcord 12 whereby ripcord 12 rips cable core binder 26, water-swellable tape 27, and tape binder 29 for facilitating access to optical fibers 24 (FIG. 4).

Buffer tube 23' according to another embodiment of the present invention is shown in FIG. 5. Buffer tube 23' includes at least one ripcord 12 having at least a portion thereof embedded within buffer tube 23'. More specifically, ripcord 12 includes a portion thereof disposed between an inner surface 23a' and an outer surface 23b' of buffer tube 23'. Ripcord 12 can be a dielectric, conductive, or a semi-conductive material and is operable to assist in removing buffer tube 23' to gain access to optical fiber 25 therein. In another embodiment, ripcord 12 is removably attached to inner surface 23a' of buffer tube 23' by a suitable means, for example, an adhesive. Additionally, ripcord 12 may be disposed in a groove on inner surface 23a' of buffer tube 23'. In a preferred embodiment, two ripcords 12 are disposed generally about 180° degrees apart. By locating ripcords 12 about 180° apart the craftsman may, by applying a sufficient force, pull each ripcord 12 through an outer surface 23b' of buffer tube 23', thereby ripping and/or weakening buffer tube 23' into two sections. Then, the craftsman can cut the two sections from buffer tube 23', thereby exposing optical fibers 25.

Likewise as shown in FIGS. 6 and 7, ripcords according to other embodiments of the present invention may be embedded within and/or attached to any suitable cable component. Moreover, ripcords that are embedded and/or attached to suitable cable components can be formed dielectric, semi-conductive, or conductive materials. As shown in FIG. 6, ripcord 12 is removably attached to a surface of an armor tape 45' (shown before being formed around cable core), which will form an inner surface 45a' of armor tape 45' when it is formed around cable core 20. Ripcord 12 can be removably attached to armor tape 45' by any suitable means, for example, an adhesive or located within and/or under a coating on armor 45'. Additionally, armor tape 45' may be formed from any suitable material such as a dielectric or a conductive material that may be corrugated or flat. Likewise as shown in FIG. 7, ripcord 12 is removably attached to a surface of, and/or embedded within, water-swellable tape 27'. However, ripcord 12 may be disposed on an inner surface or an outer surface of a suitable cable component. However, when ripcord is disposed on an inner surface, or embedded within a cable component, it advantageously rips and/or weakens that cable component when the craftsman rips the ripcord. Additionally, attaching and/or embedding ripcord 12 advantageously generally fixes the placement of ripcord 12 with respect to at least one cable component influencing the position of the rip thereof. In another embodiment, ripcords according to the present invention can disposed between layers of a composite tape structure, for example, between a plastic or metal armor layer and a layer of a water blocking material as disclosed in U.S. Pat. No. 5,188,883, which is incorporated herein by reference.

Another embodiment of the present invention includes a ripcord having an excess length (FIG. 7a). Excess length means a portion of a ripcord having a length that is generally greater than the longitudinal length of a portion of an associated cable component and/or a fiber optic cable, thereby permitting the craftsman to pull a substantial length of the ripcord through a cut in the cable jacket without having to make a further longitudinal cut along the fiber optic cable to access and use the ripcord. However, excess length generally excludes a conventional ripcord that has a length suitable for alternating between, for example, a position within a metal sheath and a position outside of the metal sheath so that the metal sheath does require cutting to access the conventional ripcord.

As shown in FIG. 7a, ripcord 12 is attached to a surface of an associated water-swellable tape 27' so as to include an excess length 12a; however, other suitable cable components may be associated with excess length 12a of ripcord 12. Excess length 12a of ripcord 12 can be located at regular intervals of water-swellable tape 27'; however, other suitable configurations may be used such as a continuous sinusoidal path. In one embodiment, excess length 12a of ripcord 12 can be generally located at a regular fiber optic cable interval such as switchback interval of S-Z stranded buffer tubes 23. A switchback position of buffer tubes 23 is generally where a craftsman desires to make a cut for mid-span access of a fiber optic cable because buffer tubes 23 can be unwrapped from the fiber optic cable. Moreover, excess length 12a can be located without cutting into the fiber optic cable because switchback positions can be indicated on a cable jacket, for example, as disclosed in U.S. Pat. No. 6,293,081, which is incorporated herein by reference. Excess length 12a of ripcord 12 generally corresponding to switchback positions of buffer tubes 23 allows the craftsman to access a sufficient length of ripcord 12 without making a longitudinal cut in order to access and use ripcord 12.

Excess length may also reduce the tensile rigidity of relatively high tensile strength ripcords relative to other fiber optic cable components that function as tensile strength elements. This advantageously allows the fiber optic cable to maintain flexibility while inhibiting damage to other fiber optic cable components. For example, if a fiber optic cable having a steel ripcord without an excess length is located at a substantial distance from a neutral bending axis, damage to other cable components may result when the fiber optic cable is sharply and/or continuously bent. More particularly, the ripcord may want to migrate towards the neutral axis during sharp and/or continuous bending, thereby cutting and/or otherwise damaging other fiber optic cable components, which is generally an undesirable effect.

FIG. 8 shows another embodiment of the present invention. Fiber optic cable 100 includes a cable core 101 including a mono-tube 102 and at least one optical fiber 104 therein, for example, a stack of fiber optic ribbons. Strength member 106 includes at least one strength element 106a, for example, strength member 106 includes generally adjacent glass-reinforced plastics rods; however, other suitable strength elements 106a may be used. Strength members 106 are generally adjacent to mono-tube 102 and generally spaced about 180 degrees apart; however, other suitable configurations may be used. Ripcord 12 is generally disposed adjacent to at least one strength member 106a to advantageously keep ripcord 12 away from cable core 101. Ripcord 12 can be, for example, a conductive or semi-conductive material. A cable jacket 110 is then extruded thereover forming fiber optic cable 100.

During lightning testing, heat damage and related vaporization of cable components are the primary causes of fiber optic cable failures. Locating strength elements 106a generally between ripcord 12 and cable core 101, thereby allows strength elements 106a to inhibit lightning damage to cable core 101 by dissipating heat. More particularly, glass-reinforced plastic rods are relatively good thermal insulators and a relatively large amount of heat is required to vaporize them, thus in the event of a lightening strike strength elements 106a generally inhibit damage to cable core 101.

In view of the present disclosure, many modifications and other embodiments of the present invention, within the scope of the appended claims, will become apparent to a skilled artisan. For example, ripcords of the present invention may be disposed in any suitable location within a fiber optic cable. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The invention has been described with reference to a loose tube fiber optic cable and a mono-tube fiber optic cable, but the inventive concepts of the present invention are applicable to other suitable fiber optic cables as well.

That which is claimed:

1. A fiber optic cable, said fiber optic cable comprising:
   a cable core having at least one optical fiber;
   a ripcord, the ripcord being an electrically conductive material operative, upon application of a sufficient pulling force, to rip at least one cable component for facilitating access to said at least one optical fiber, said ripcord having a serrated surface roughness formed thereon, thereby enhancing its ripping characteristics.

2. The fiber optic cable of claim 1, said ripcord having an excess length.

3. The fiber optic cable of claim 1, said ripcord being generally stranded around a longitudinal axis of said fiber optic cable.

4. The fiber optic cable of claim 1, said ripcord including a coating thereon.

5. The fiber optic cable of claim 1, said ripcord having a diameter of at least about 0.012 inches.

6. The fiber optic cable of claim 1, said ripcord being disposed generally adjacent to at least one strength element.

7. The fiber optic cable of claim 1, said ripcord being selected from one of the group of copper, steel, aluminum, and copper-cladded steel.

8. The fiber optic cable of claim 1, said ripcord having a portion thereof embedded within a buffer tube.

9. The fiber optic cable of claim 1, said ripcord being removably attached to at least one cable component.

10. The fiber optic cable of claim 1, said ripcord having a tensile strength being in the range of about 20 ksi to about 230 ksi.

11. A fiber optic cable, said fiber optic cable comprising:
    a cable core having at least one optical fiber, the cable core having at least one switchback portion;
    a ripcord, the ripcord having an excess length with respect to an associated portion of the fiber optic cable and being operative, said excess length being proximate to the at least one switchback portion of the cable core, upon application of a sufficient pulling force, to rip at least one cable component for facilitating access to said at least one optical fiber.

12. The fiber optic cable of claim 11, said ripcord being a conductive material.

13. The fiber optic cable of claim 11, said ripcord being selected from one of the group of copper, steel, aluminum, and copper-cladded steel.

14. The fiber optic cable of claim 11, said ripcord being a dielectric material.

15. The fiber optic cable of claim 11, said ripcord being a portion of a semi-conductive material.

16. The fiber optic cable of claim 11, said ripcord including a coating thereon.

17. The fiber optic cable of claim 11, said ripcord having a portion thereof embedded within a cable component.

18. The fiber optic cable of claim 11, said ripcord having a portion thereof attached to a cable component.

* * * * *

UNITED STATES PATENT AND TRADEMARK OFFICE
CERTIFICATE OF CORRECTION

PATENT NO.    : 6,813,421 B2
DATED         : November 2, 2004
INVENTOR(S)   : Lail et al.

It is certified that error appears in the above-identified patent and that said Letters Patent is hereby corrected as shown below:

Column 10,
Lines 5-6, delete "and being operative"
Line 8, insert -- and the ripcord being operative -- before the word "upon"

Signed and Sealed this

Thirty-first Day of May, 2005

JON W. DUDAS
*Director of the United States Patent and Trademark Office*